US009146832B2

(12) United States Patent
Degenhardt et al.

(10) Patent No.: US 9,146,832 B2
(45) Date of Patent: Sep. 29, 2015

(54) DEBUGGING FUNCTIONALITY EMBEDDED IN AN APPLICATION

(75) Inventors: Jon Rexford Degenhardt, Mountain View, CA (US); Sudhakar Kaki, Pleasanton, CA (US); Maria Elisabeth Kaval, Menlo Park, CA (US); Sinfan Tang, Castro Valley, CA (US); Sanjin Tulac, Mountain View, CA (US); Rahim Mohamed Yaseen, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2807 days.

(21) Appl. No.: 11/580,946

(22) Filed: Oct. 13, 2006

(65) Prior Publication Data
US 2007/0240125 A1 Oct. 11, 2007

Related U.S. Application Data

(60) Provisional application No. 61/727,248, filed on Oct. 14, 2005, provisional application No. 60/726,871, filed on Oct. 14, 2005.

(51) Int. Cl.
G06F 9/44 (2006.01)
G06F 11/36 (2006.01)
G06F 11/30 (2006.01)

(52) U.S. Cl.
CPC ............ G06F 11/3632 (2013.01); G06F 11/30 (2013.01); G06F 11/3644 (2013.01)

(58) Field of Classification Search
CPC ...... G06F 11/30; G06F 11/36; G06F 11/3644
See application file for complete search history.

(56) References Cited

U.S. PATENT DOCUMENTS

| 5,265,254 | A | * | 11/1993 | Blasciak et al. | 717/130 |
| 5,533,192 | A | * | 7/1996 | Hawley et al. | 714/28 |
| 5,815,714 | A | * | 9/1998 | Shridhar et al. | 717/129 |
| 6,119,247 | A | * | 9/2000 | House et al. | 714/38 |
| 6,289,300 | B1 | * | 9/2001 | Brannick et al. | 703/28 |
| 6,412,106 | B1 | * | 6/2002 | Leask et al. | 717/124 |
| 6,587,995 | B1 | * | 7/2003 | Duboc et al. | 716/106 |
| 6,681,343 | B1 | * | 1/2004 | Nakabo | 714/38 |
| 6,748,583 | B2 | * | 6/2004 | Aizenbud-Reshef et al. | 717/127 |
| 7,519,960 | B2 | * | 4/2009 | Mei et al. | 717/129 |

(Continued)

OTHER PUBLICATIONS

Tadashi Takeuchi, "OS Debugging Method Using a Lightweight Virtual Machine Monitor", [Online], 2005, pp. 1-2, [Retrieved from Internet on Apr. 24, 2015], <http://arxiv.org/ftp/arxiv/papers/0710/0710.4635.pdf>.*

(Continued)

Primary Examiner — Thuy Dao
Assistant Examiner — Ziaul A Chowdhury
(74) Attorney, Agent, or Firm — Campbell Stephenson LLP

(57) ABSTRACT

In one embodiment, a method for providing a debugging functionality embedded in an application supporting an n-tiered architecture includes determining that the debugging functionality embedded in the application is requested, and causing current state information to be presented to a user at each break point in the production environment.

20 Claims, 15 Drawing Sheets

(56) References Cited

U.S. PATENT DOCUMENTS

| | | | |
|---|---|---|---|
| 7,607,124 B2* | 10/2009 | Gooty et al. | 717/129 |
| 7,765,525 B1* | 7/2010 | Davidson et al. | 717/124 |
| 8,607,199 B2* | 12/2013 | Kim et al. | 717/124 |
| 8,683,444 B1* | 3/2014 | Spycher et al. | 717/125 |
| 2003/0046663 A1* | 3/2003 | Rogers et al. | 717/125 |
| 2003/0093771 A1* | 5/2003 | Ogawa et al. | 717/125 |
| 2003/0167459 A1* | 9/2003 | Bates et al. | 717/125 |
| 2004/0111727 A1* | 6/2004 | Schwarzbauer et al. | 719/310 |
| 2005/0071243 A1* | 3/2005 | Somasekaran et al. | 705/26 |
| 2005/0132338 A1* | 6/2005 | Kalra | 717/129 |
| 2005/0177820 A1* | 8/2005 | Mei et al. | 717/129 |
| 2007/0005944 A1* | 1/2007 | Murty et al. | 712/227 |
| 2009/0300399 A1* | 12/2009 | Archer et al. | 713/340 |
| 2010/0162049 A1* | 6/2010 | Stall et al. | 714/38 |
| 2012/0272218 A1* | 10/2012 | Bates | 717/125 |

OTHER PUBLICATIONS

Kebin Zeng et al. "Graphical Model Debugger Framework for Embedded Systems", [Online], 2010, pp. 87-92, [Retrieved from Internet on Apr. 24, 2015], <http://delivery.acm.org/10.1145/1880000/1870949/p87-zeng.pdf>.*

Pornjit Pratumsuwan et al., "An Embedded PLC Development for Teaching in Mechatronics Education", [Online], pp. 70-74, [Retrieved from Interent on Apr. 24, 2015], <http://ieeexplore.ieee.org/stamp/stamp.jsp?tp=&arnumber=5975823>.*

Jeong-Hoon Ji et al., "Design and Implementation of Retargetable Software Debugger based on GDB", [Online], 2008, pp. 737-740, Retrieved from Internet on Apr. 25, 2015, <http://eslab.cse.nsysu.edu.tw/seminar/seminar_file/2009/090619_tclin_paper.pdf>.*

* cited by examiner

FIG. 5B

| Name | Value | Type |
|---|---|---|
| Task Field Activity Preparation(v16) | | |
| Object Id | 42-50S4E | String |
| Siebel Operation Object Id | | String |
| Instance Identifier | Sanjin - Test | String |
| Error Code | | String |
| Error Message | | String |
| En Route | 0 | Number |
| NumOfInstructions | 0 | Number |
| Activity Status | | String |
| NumOfRecommendedParts | 0 | Number |
| StatusChoice | | String |
| Task Is Done | 0 | Number |
| Primary Business Component: Action | | |
| Account Currency Code | USD | Text |
| Account Id | 1-12U5D | ID |
| Account Location | HQ-MILWAUKEE-102224623 | Text |
| Account Name | Harley-Davidson Inc | Text |
| Active Flag | N | Boolean |
| Activity Defect Id | | ID |
| Activity SR Id | | ID |
| Activity UID | 42-50S4E | Text |
| Agreement Id | | ID |

Field Activity Main Task(v5). Preparation >Field Activity Preparation(v16).FieldActivity Details View(Task)[View]
Last Action: Next Field Activity Main Task(v5): Preparation >Field Activity Preparation(v16): Query Recommended Parts [DB Operation]

Last Action: Next

| Name | Value | Type |
|---|---|---|
| Task Field Activity Preparation(v16) | | |
| Object Id | 42-50S4E | String |
| Siebel Operation Object Id | * | String |
| Instance Identifier | Sanjin - Test | String |
| Error Code | | String |
| Error Message | | String |
| En Route | 0 | Number |
| NumOfInstructions | 0 | Number |
| Activity Status | | String |
| NumOfRecommendedParts | 2 | Number |
| StatusChoice | | String |
| Task Is Done | 0 | Number |
| Primary Business Component: Action | | |
| Account Currency Code | USD | Text |
| Account Id | 1-12U5D | ID |
| Account Location | HQ-MILWAUKEE-1022224623 | Text |
| Account Name | Harley-Davidson Inc | Text |
| Active Flag | N | Boolean |

FIG. 5C

DEBUGGING FUNCTIONALITY EMBEDDED IN AN APPLICATION

RELATED APPLICATIONS

The present application claims priority to U.S. Provisional Application Ser. Nos. 60/727,248 and 60/726,871, both filed Oct. 14, 2005, which are incorporated herein in their entirety.

FIELD OF THE INVENTION

Embodiments of the present invention relate generally to data processing, and more particularly to providing debugging functionality embedded in an application.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2006, Oracle Corp., All Rights Reserved.

BACKGROUND OF THE INVENTION

A debugger is a computer program that is used to test and debug other programs. When the program crashes, the debugger shows the position in the original code if it is a source-level debugger or symbolic debugger, commonly seen in integrated development environments. If it is a low-level debugger or a machine-language debugger, it shows the line in the disassembly that occurs if a "crash" happens when the program cannot continue because of a programming bug. Conventional debuggers also offer more sophisticated functions such as running a program step by step (single-stepping), stopping (breaking or pausing the program to examine the current state) at some kind of event by means of breakpoint, and tracking the values of some variables. Some debuggers have the ability to modify the state of the program while it is running, rather than merely observe it.

Debuggers make the debugging process much easier and faster, to the point where the availability of a good debugger for a particular language and platform can sway the decision to use that language rather than another language that is superior in other respects but lacks such tools.

A significant limitation of existing debuggers is that software running under a debugger typically behaves differently than software running normally, because a debugger changes the internal timing of a software program. That makes it often very difficult to track down runtime problems in complex multi-threaded or distributed systems.

In a multi-tiered environment (e.g., a client-server environment), conventional debuggers typically operate using a window on the client side and a window on the server side. The problem with this approach is that it requires the user to keep the two windows open and in-sync during the entire debugging process. Another common scheme is to build the debugger into the design-time tooling environment. However, this makes tracking debugging problems occurring in the production environment more difficult. In addition, design-time debuggers usually connect to the runtime engine, and have the problem of synchronized display of the debugger and end-user user interfaces.

SUMMARY OF THE INVENTION

The present invention relates to various aspects of providing a debugging functionality embedded in an application that supports an n-tiered architecture.

According to one aspect of the present invention, an exemplary method includes determining that the debugging functionality embedded in the application is requested, and causing state information to be presented to a user at each break point in the production environment.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 5A-5E show exemplary task UIs illustrating debugging functionality pertaining to a task flow of FIGS. 4A and 4B, in accordance with some embodiments of the invention.

DETAILED DESCRIPTION OF THE INVENTION

Figure 1:
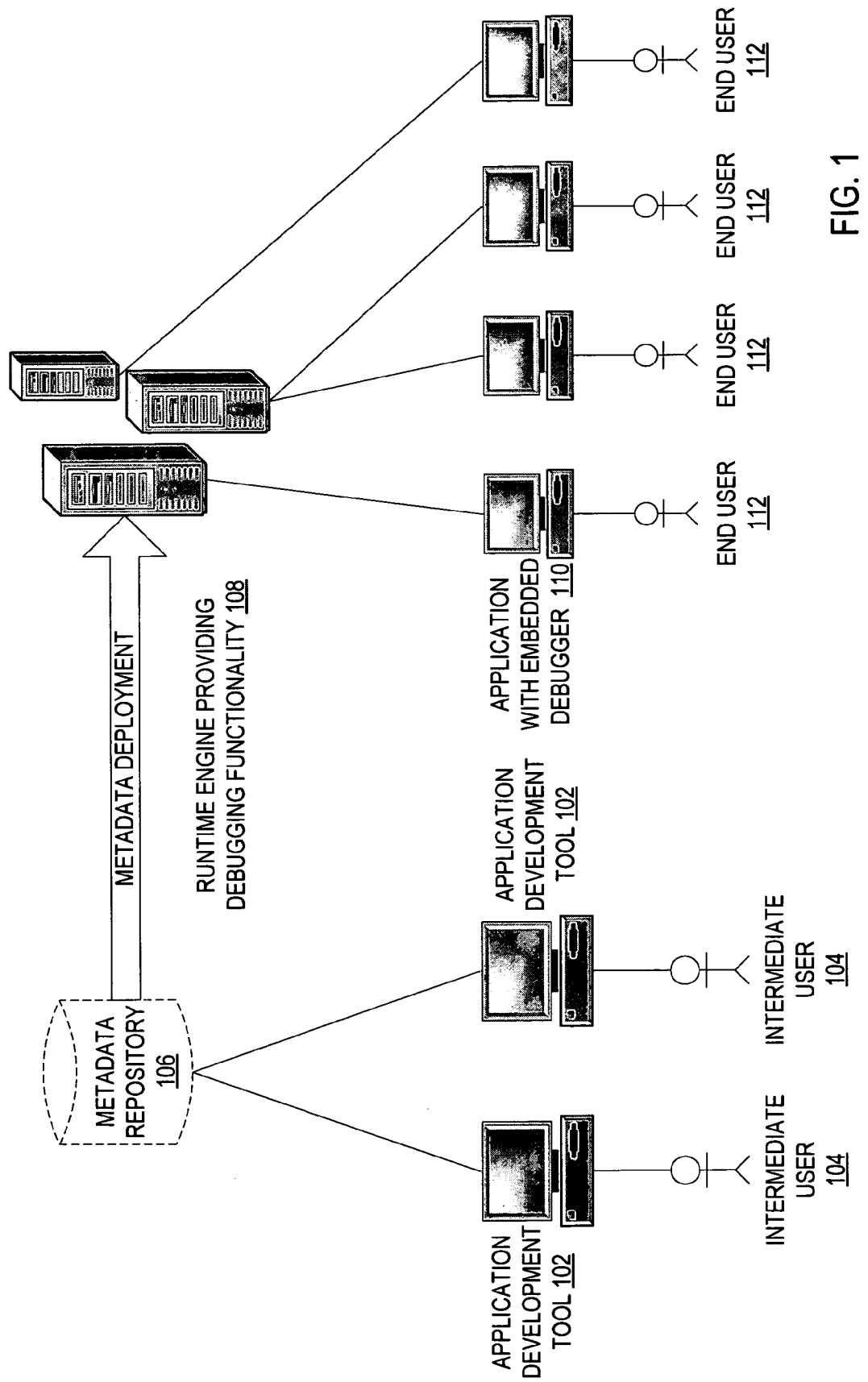
FIG. 1 is a block diagram of one embodiment of a system for providing debugging functionality embedded in an application.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram of one embodiment of a system for providing debugging functionality embedded in an application. The system includes one or more servers hosting a runtime engine 108, and multiple clients each hosting an application development tool 102 and/or an application 110.

The application 110 may be a web application providing user interfaces (UIs) to end users 112, a web service performing operations requested by end users 112, or any other application that supports the n-tiered architecture (e.g., a client-server architecture, 3-tiered web application architecture, service oriented architecture, etc.). As shown in FIG. 1, clients host a front-end portion of the application 110 and the runtime engine 108 constitutes a back-end portion of the application 110.

The application development tool 102 allows intermediate users 104 (e.g., business analysts, software developers, etc.) to design the application 110. In one embodiment, the application development tool 102 is a declarative tool that allows intermediate users 104 to design the application 110 without writing any code.

In one embodiment, the application 110 is flow driven, and the tool 102 enables intermediate users 104 to specify steps of the flow and the execution sequence for the steps. The steps may include, for example, UI view steps, database operation steps, decision steps, service (external and/or internal) invocation steps, etc. The tool 102 may be a graphical editor that allows an intermediate user 104 to create a visual representation of the flow that reflects the steps and their execution sequence. In one embodiment, the visual representation of the flow is in the form of a flowchart that includes a sequence of steps to be performed within a unit of work by the application 110. A unit of work may be a task, a service or a similar entity, collectively referred to herein as a task. A task can span multiple user login sessions, process boundaries, and/or database and application server restarts. In one embodiment, the tool 102 enables an intermediate user 104 to define navigation controls for UI view steps of the task. These navigation controls may include, for example, Next/Previous buttons, Pause button, Cancel button, etc.

In one embodiment, the tool 102 allows an intermediate user 104 to specify properties for the task. These properties may include task-level properties defining characteristics of the task (e.g., the name of the task, transactional behavior, etc.) and step-level properties defining characteristics of individual steps (e.g., fields to be entered by an end user for a UI view step, database fields to be updated for a database operation step, branching conditions for a decision step, the name of a service to be called for a service invocation step, etc.). In one embodiment, the tool 102 converts the visual representation of the task and the task properties into a collection of metadata and stores the resulting collection of metadata in a metadata repository 106. The metadata may be represented, for example, using an XML document based on an XML schema.

The runtime engine 108 executes the application 110 at run time using application design information stored by the tool 102. In one embodiment, the runtime engine 108 deploys, at runtime, task metadata stored in the metadata repository 106 and processes the task metadata to execute the application 110 for end users 112. The end users 112 may be any users including, for example, connected or disconnected mobile users. Mobile end users may launch and run while operating in disconnected mode. When the end user is connected, any data resulting from completed tasks is synchronized back to the server.

The runtime engine 108 provides debugging functionality that is embedded in the application 110. In particular, the debugger is one of several functionalities that can be performed by the application 110 at runtime. A user (e.g., an end user 112 or intermediate user 104) can turn the debug mode on and off during the execution of the application 110, without having to launch a different application or tool, or to open a new window. For example, if the application 110 provides UI views, a menu on the UI may include a debug mode option that can be turned on or off while the user is presented with the UI. The debug mode option may be selectively enabled (e.g., by a system administrator) when used in production to allow only specific users or types of users to perform the debugging. When the user turns the debug mode on, the runtime engine 108 collects current state information and causes it to be presented to the user at each break point. In one embodiment, in which the application 110 is flow driven, the runtime engine 108 assumes a breakpoint after each step within the flow. Alternatively, the runtime engine 108 automatically defines breakpoints after predefined operations to be performed by the application 110.

In one embodiment, the state information collected by the runtime engine 108 is presented in a debugging window such as a popup window or a pane in a UI provided by the application 110. The state information may include, for example, the last operation or step performed by the application 110, the values of local variables, the state of business objects, the state of active database records, etc. A business object is a collection of data associated with particular UI. In one embodiment, the current state information is displayed in a form similar to that used in the design-time environment to aid the debugging process. In one embodiment, modifications of the state are allowed through the debugging window to test the effect of specific changes.

Because the debugging functionality is embedded in the application 110, the debugger can run in the production environment without affecting the underlying behavior of the application 110, thus making it easy to track problems occurring in the production environment. In addition, as opposed to design-time debuggers that need to connect to the runtime engine, there is no need to synchronize the display of the debugger and end-user UIs. Furthermore, by integrating a client-side debugging window with the end-user display, the need to keep windows open and in sync simultaneously on the client and server is eliminated.

Figure 2:
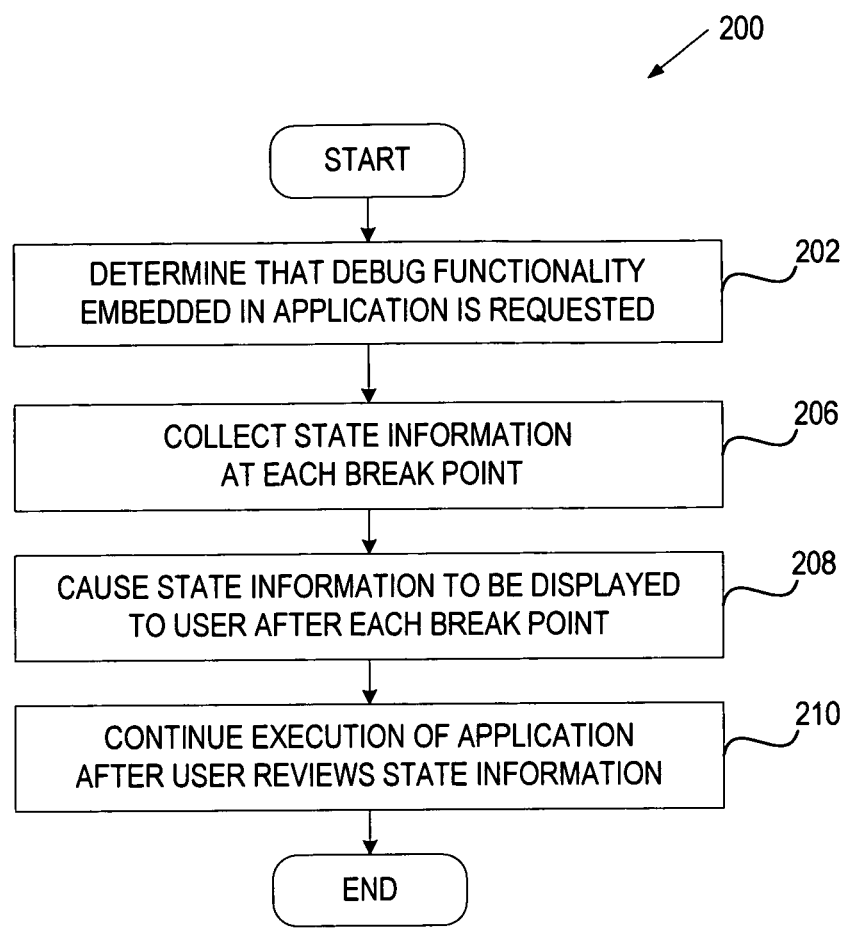
FIG. 2 is a flow diagram of one embodiment of a method for providing debugging functionality embedded in an application that supports an n-tiered architecture.

FIG. 2 is a flow diagram of one embodiment of a method 200 for providing debugging functionality embedded in an application that supports an n-tiered architecture. The method may be performed by processing logic that may comprise hardware (e.g., circuitry, dedicated logic, etc.), software (such as run on a general purpose computer system or a dedicated machine), or a combination of both. Processing logic may reside in the runtime engine 108 of FIG. 1.

Referring to FIG. 2, method 200 begins with processing logic determining that the debugging functionality is requested (block 202). The debugging functionality is embedded in the application to be debugged. In one embodiment, the debugging functionality is requested when a user selects a debug mode option in a UI presented by the application while executing in a non-debug mode. An exemplary UI providing a debug mode option will be discussed in more detail below in conjunction with FIG. 5A.

Next, at each breakpoint, processing logic collects current state information of the application being executed (block 206). In one embodiment, processing logic uses break points predefined after certain operations performed by the applications. For example, if the application is flow driven, processing logic may assume a break point after each step in the flow. Alternatively, processing logic may automatically define break points based on predefined criteria upon determining that the debugging functionality has been requested. The predefined criteria may specify, for example, certain operations that should serve as break points, the number of operations to be performed between two breakpoints, etc. The current state information may include, for example, the last operation or step performed by the application, the values of local variables, the state of business objects, the state of active database records, etc. In one embodiment, the local variables and database objects are defined by a user when designing the application.

At block 208, processing logic causes the current state information to be displayed to the user after each breakpoint. The current state information may be presented in a debugging window such as a popup window or a pane in a UI provided by the application. The current state information may be displayed in a form similar to that used in the design-time environment to aid the debugging process. When displayed Exemplary UIs presenting state information will be discussed in more detail below in conjunction with FIGS. 5B-5D.

At block 210, processing logic continues with the execution of the application after presenting the current state information to the user. In one embodiment, in which the state information is presented in a popup window, processing logic waits for the user to dismiss the window before continuing the execution of the application. In another embodiment, in which the state information is presented in a pane, processing logic continues the execution of the application upon a user's gestures, in a manner similar to that used during the application execution in the non-debug mode.

At any time, processing logic may receive a user request to turn the debug mode off. For example, such a user request may be received when the user selects a non-debug mode option in a UI presented by the application. Upon receiving the user request to turn the debug mode off, processing logic continues the execution of the application in the non-debug mode. In one embodiment, processing logic discards previously generated break points. Alternatively, processing logic does not discard existing break points but rather stops providing state information at these break points.

Embodiments of a debugger embedded in a flow-driven application will now be discussed in more detail. One example of a flow-driven application is a task UI application providing wizard-style, guided UIs for accomplishing business tasks. A business task may support a variety of different processes including, for example, filling out objectives, applying for a loan, conducting a survey, qualifying a lead, approving expense-reports, etc. The wizard-style UIs lead an end user to perform process-centric work that may include applying business logic, evaluating conditional fields, external system integration, etc. The result is an improved end-user experience with shorter learning curves and higher task completion rates. In one embodiment, the wizard-style UIs are provided by a runtime engine (e.g., runtime engine 108 of FIG. 1) that deploys, at runtime, task metadata created by an application development tool (e.g., tool 102 of FIG. 1) and processes the task metadata to produce a set of wizard-style UIs.

Figure 3:
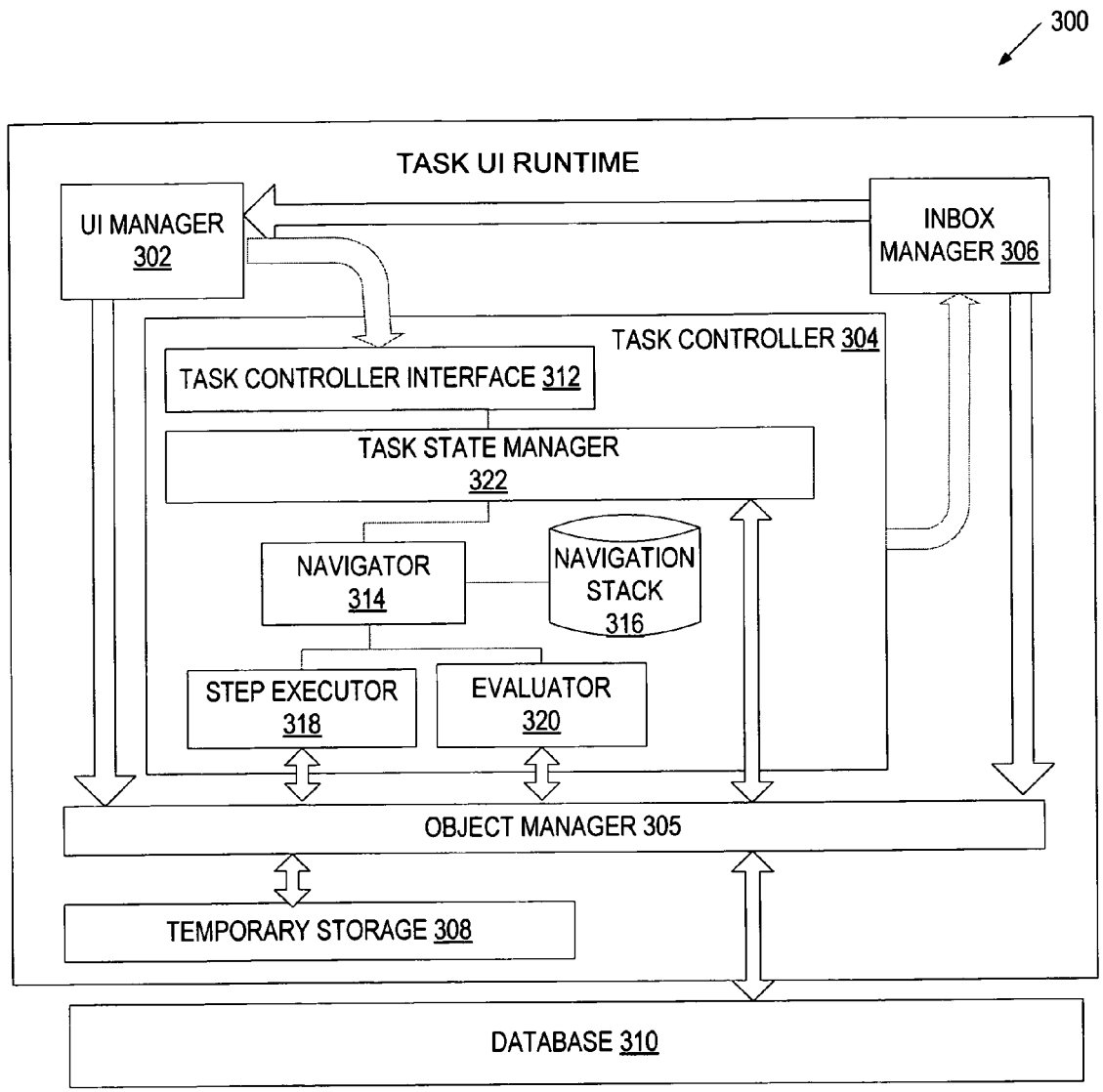
FIG. 3 is a block diagram of one embodiment of a runtime engine for a task UI application.

FIG. 3 is a block diagram of one embodiment of a runtime engine 300 for a task UI application. The runtime engine 300 includes a UI manager 302, an Inbox manager 306, a task controller 304, an object manager 305, a temporary storage 308 and a main database 310.

The UI manager 302 is responsible for rendering and presenting wizard-style task UIs to end users, and communicating the end user input to the object manager 305 and task controller 304. The Inbox manager 306 is responsible for controlling new and paused tasks stored in users' Inboxes.

The task controller 304 is responsible for analyzing the metadata pertaining to the task and the end user input, and executing flow and business logic based on this analysis to guide the end user through the business task. After each step, the task controller 304 checks whether a debug mode option is turned on. If so, the task controller 304 collects current state information and passes it to the UI manager 302 for presentation to the user.

The temporary storage 308 stores data associated with the task throughout the lifetime of the task. In one embodiment, this data is only visible while the task is executing and only to the end user running the task. In another embodiment, the temporary storage 308 may be shared across multiple tasks and their end users. Once an end user successfully completes the task, the data stored in the temporary storage 308 for this task is committed to the database 310 and becomes visible to other users in the organization.

The object manager 305 provides data management for the task controller 304, Inbox manager 306 and the UI manager 302. In one embodiment, the object manager 305 supports transaction isolation for operations performed within the boundary of a task in a manner transparent to its client components. The object manager 305 stores updates associated with these operations in the temporary storage 308 until the task controller 304 calls the object manager 305 to commit the data to the database 310.

In one embodiment, the task controller 304 includes a task controller interface 312, a navigator 314, a navigation stack 316, a step executor 318, an evaluator 320 and a task state manager 322.

In one embodiment, the task controller interface 312 interacts with the UI manager 302, and invokes appropriate internal components of the task controller 304. In one embodiment, the task controller interface 312 includes one or more APIs to communicate with different entities.

The navigator 314 calls the step executor 318 to execute the step activity, and pushes the step instance into the navigation stack 316. The navigator 314 is responsible for performing forward and backward navigation. In one embodiment, when at the decision point, the navigator 314 calls the evaluator 320 to evaluate branch condition criteria and determine the forward path. On forward navigation for all other step types, the navigator 314 may call the step executor 318 to execute the activity represented by the step, and push the stack frame into the navigation stack 316. Each stack frame may contain a reference to the current business object state. The navigator 314 restores business object states from the navigation stack 316 for the task views during backward navigation.

After each step, the navigator 314 checks whether a debug mode option is turned on. If so, the navigator 314 collects current state information based on contents of a corresponding stack frame, and passes the current state information to the task controller interface 312, which then communicates it to the UI manager 302 for presentation to the user.

The task state manager 322 is responsible for maintaining the life cycle of task instances and their states. In addition to navigation stack, task state encompasses the values of all task variables for the current task instance.

Exemplary UIs illustrating debugging functionality embedded in a task UI application will now be discussed in more detail. When debugging a task UI application, a user may review in parallel a task flow created for the application during the design time. The user may maintain a separate window displaying the task flow. Alternatively, the task UI application may provide an additional pane in the task UI for displaying the task flow. In one embodiment, the task UI application identifies (e.g., via highlighting or other graphical means) a currently executed step in the task flow displayed in the additional pane.

Figure 4A:
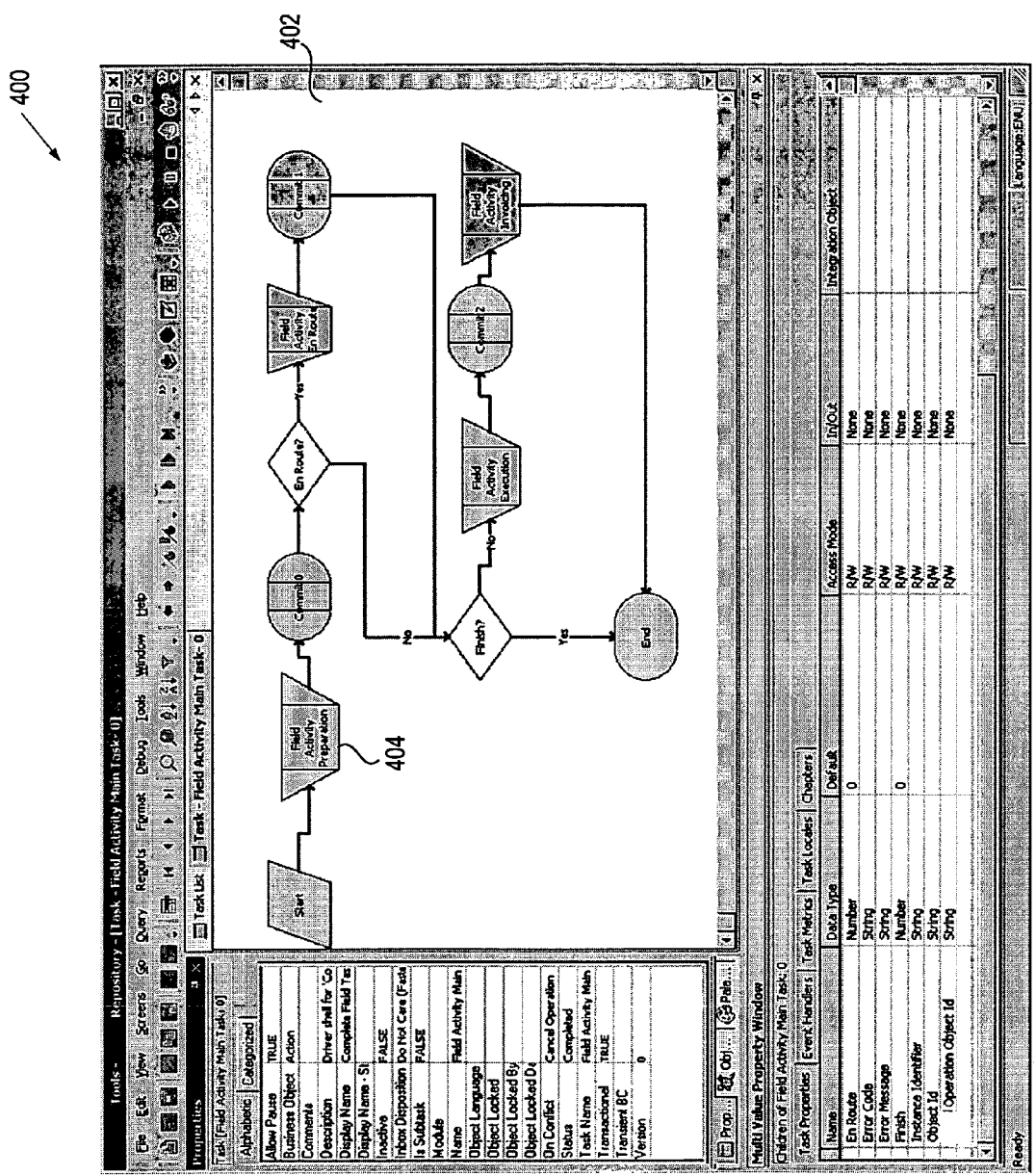
FIGS. 4A and 4B illustrate an exemplary task UI application flow created by an intermediate user in a design environment according to some embodiments of the invention.
Figure 4B:
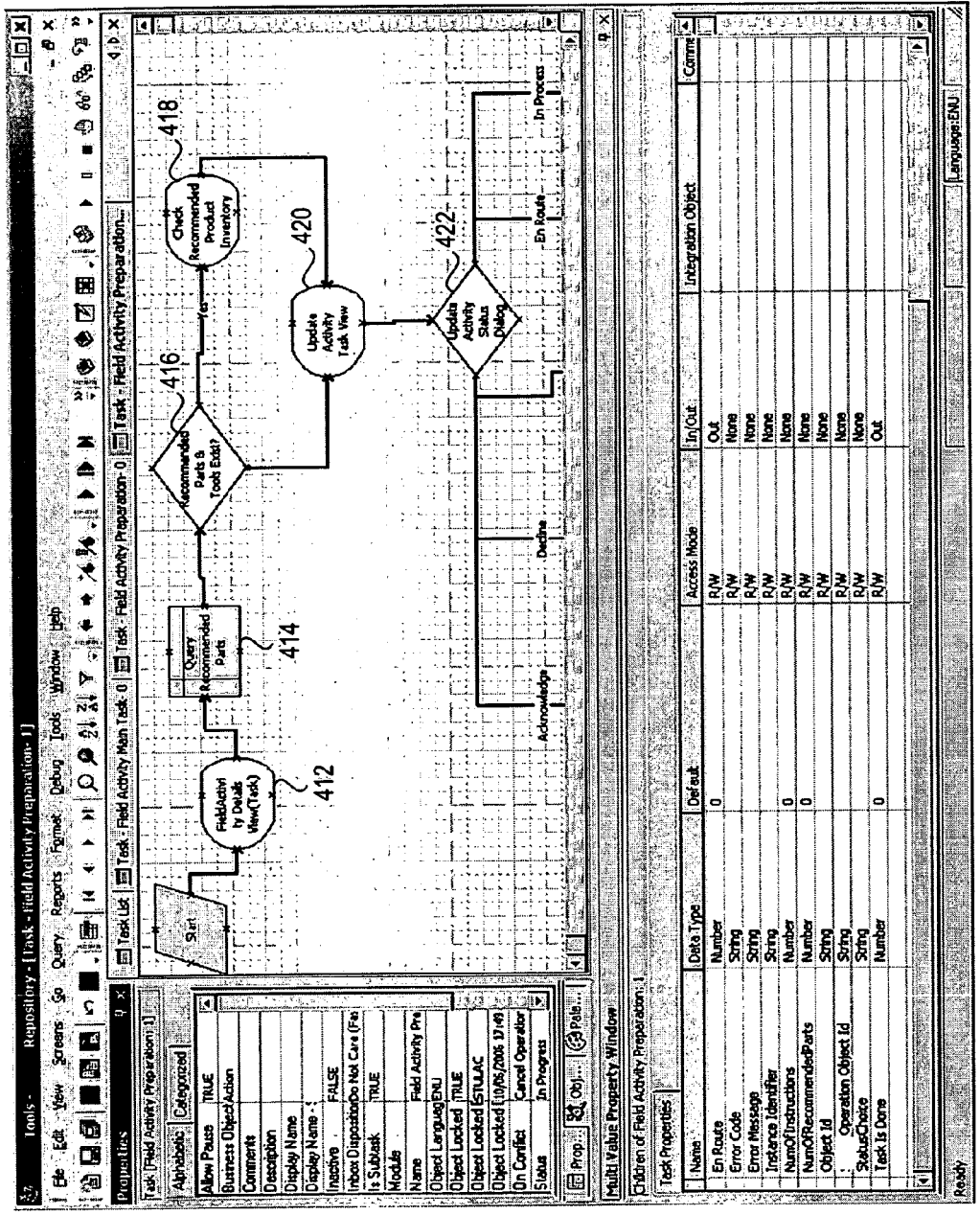

FIGS. 4A and 4B illustrate an exemplary task UI application flow created by an intermediate user in a design environment (e.g., using application development tool 102 of FIG. 1) according to some embodiments of the invention.

Referring to FIG. 4A, UI 400 provides a task flow 402 having several steps. Step 404 is a subtask. A subtask includes a reusable portion of a business task that does not affect the UI behavior seen by end users.

Referring to FIG. 4B, UI 410 provides a flow 402 of the subtask 404 having several steps. Steps 412, 418 and 420 are UI views. Step 414 is a database operation step. Steps 416 and 422 are decision steps.

FIGS. 5A-5E show exemplary task UIs illustrating debugging functionality pertaining to a task flow of FIGS. 4A and 4B, in accordance with some embodiments of the invention.

Figure 5A:
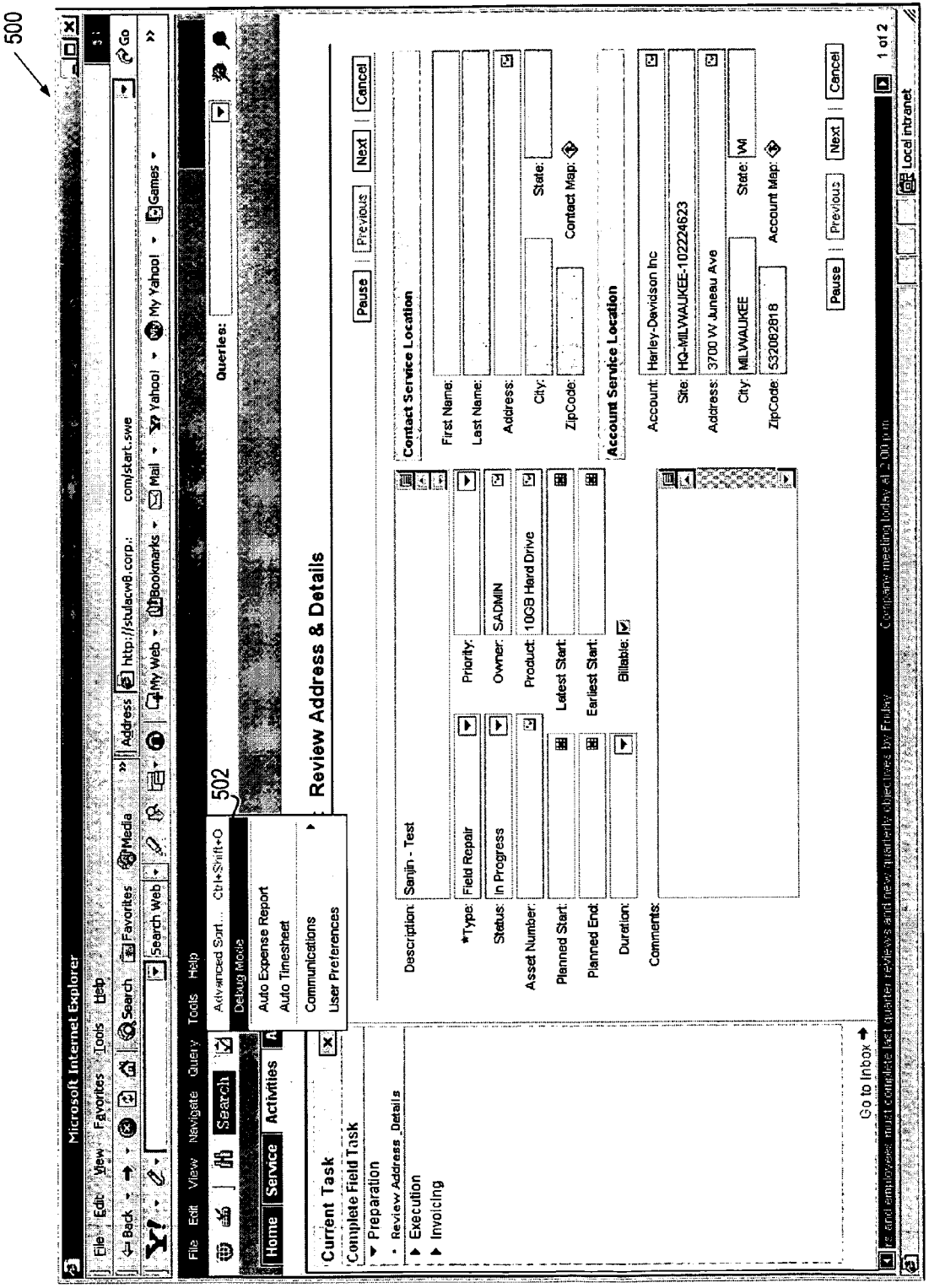

Referring to FIG. 5A, UI 500 displays a UI view for a subtask step 412 of the subtask flow. The UI 500 includes an application menu having a debug mode item 502. The user can turn the debugger on by selecting the debug mode item 502. In one embodiment, the user can turn the debug mode on only if he has been granted access. Access can be given out temporarily to a particular user or users in a specific role to debug problems that are reproducible only for specific end-users in specific run-time environments.

Once this selection is made, the task UI application continues to work as usual, except that a debugging popup window appears after the execution of each step to allow the user to inspect the current state of the application.

Referring to FIG. 5B, UI 510 is presented in the debugging popup window. The top portion 514 of the UI 510 displays the call stack consisting of the task name and version, the subtask name and version, the step name and type (e.g., view, database operation, etc.) of the last executed step, as well as the last user action (e.g., next, previous, etc.). The last executed step is a view step 412. The UI 510 also displays state information 516 that includes values of local variables and the state of business objects. Information is displayed in a form similar to that used in the design-time environment to aid the debugging process. In one embodiment, modification of the state is allowed through the debugging window to test the effect of specific modifications.

Pressing button 518 causes the execution of the next step (subtask step 414). Pressing button 512 causes the task to be canceled.

Referring to FIG. 5C, UI 520 is presented after the subtask step 414 is executed. The top portion of the UI 520 includes the name 533 of the subtask step 414. The execution of this step results in variable 524 being changed from 0 to 2. This change is considered during the execution of the next step 416, which is a decision step that determines which branch to go to based on the value of the variable 524.

Figure 5D:
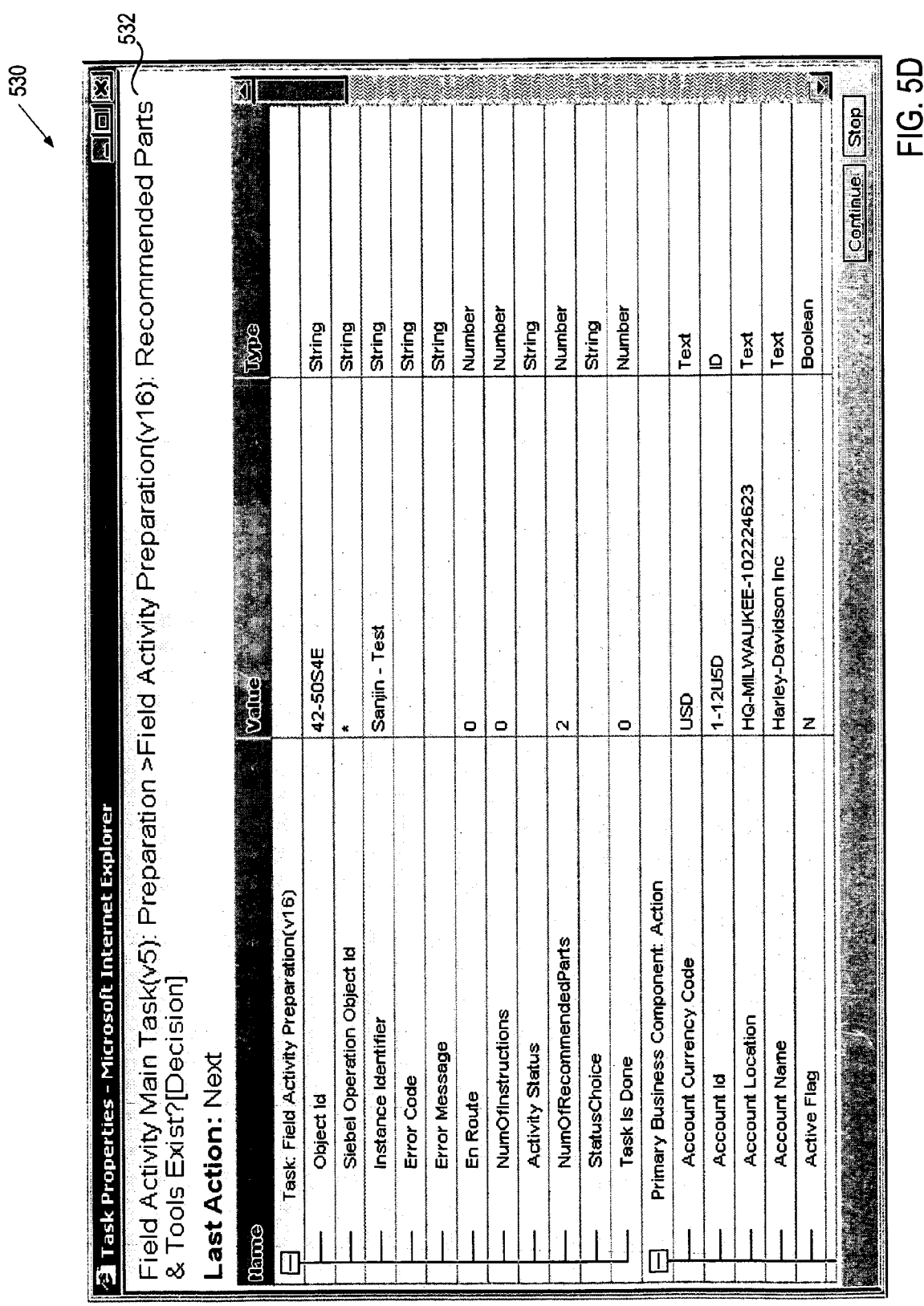

Referring to FIG. 5D, UI 530 is presented after the subtask step 416 is executed. The top portion of the UI 530 displays the name 532 of the subtask step 416. Pressing the continue button causes the execution of a subtask step 418, which is a UI view step.

Figure 5E:
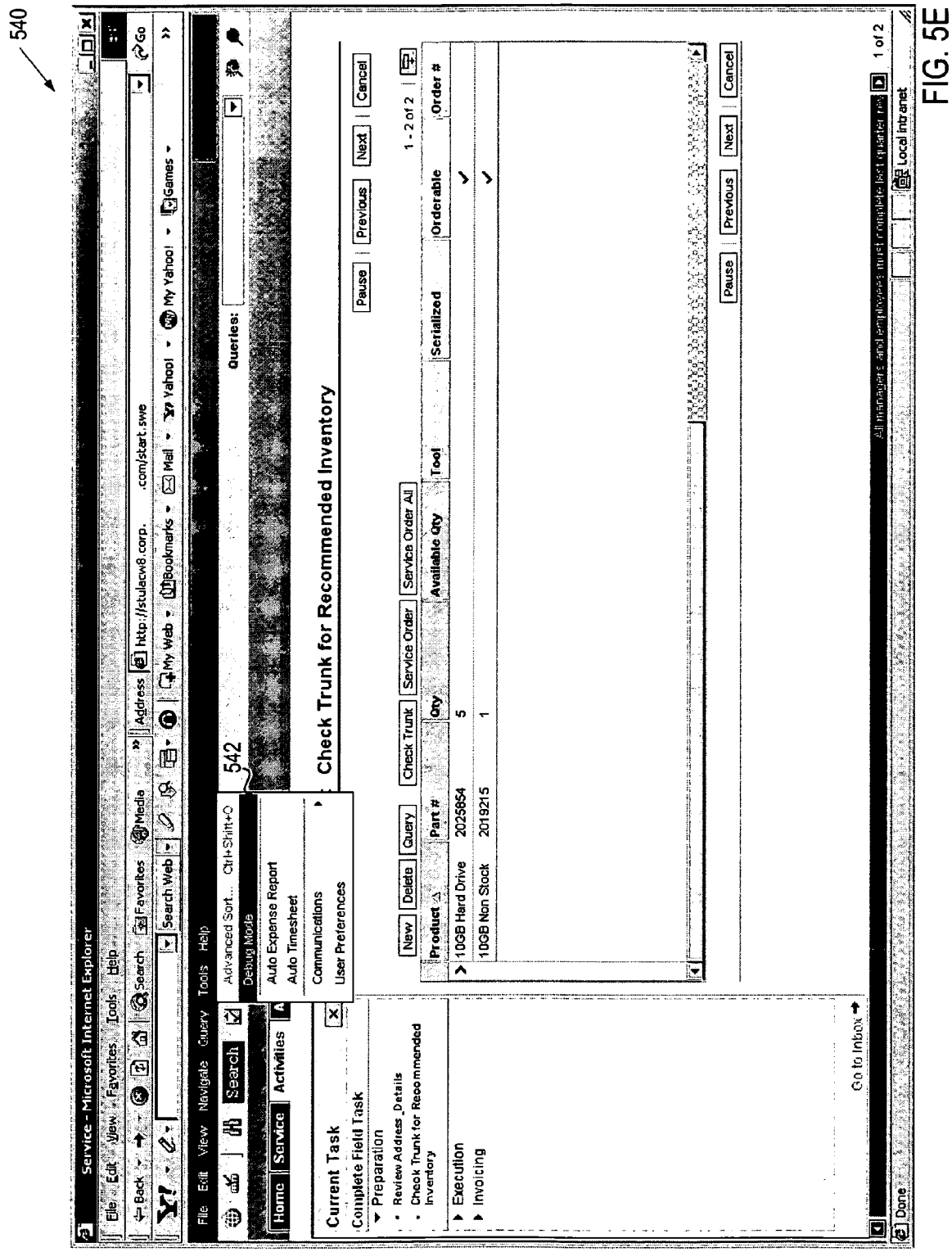

Referring to FIG. 5E, UI 540 displays a UI view for the subtask step 418 of the subtask flow. The user can toggle the debug mode item 542 in the application menu to turn the debugger off.

Hence, a client-side UI is provided that consists of both the debugging windows and the actual end-user UI views. The debugger does not interfere with the end-user UI views, as they operate the same regardless of whether the debugging mode is on or off.

Figure 6:
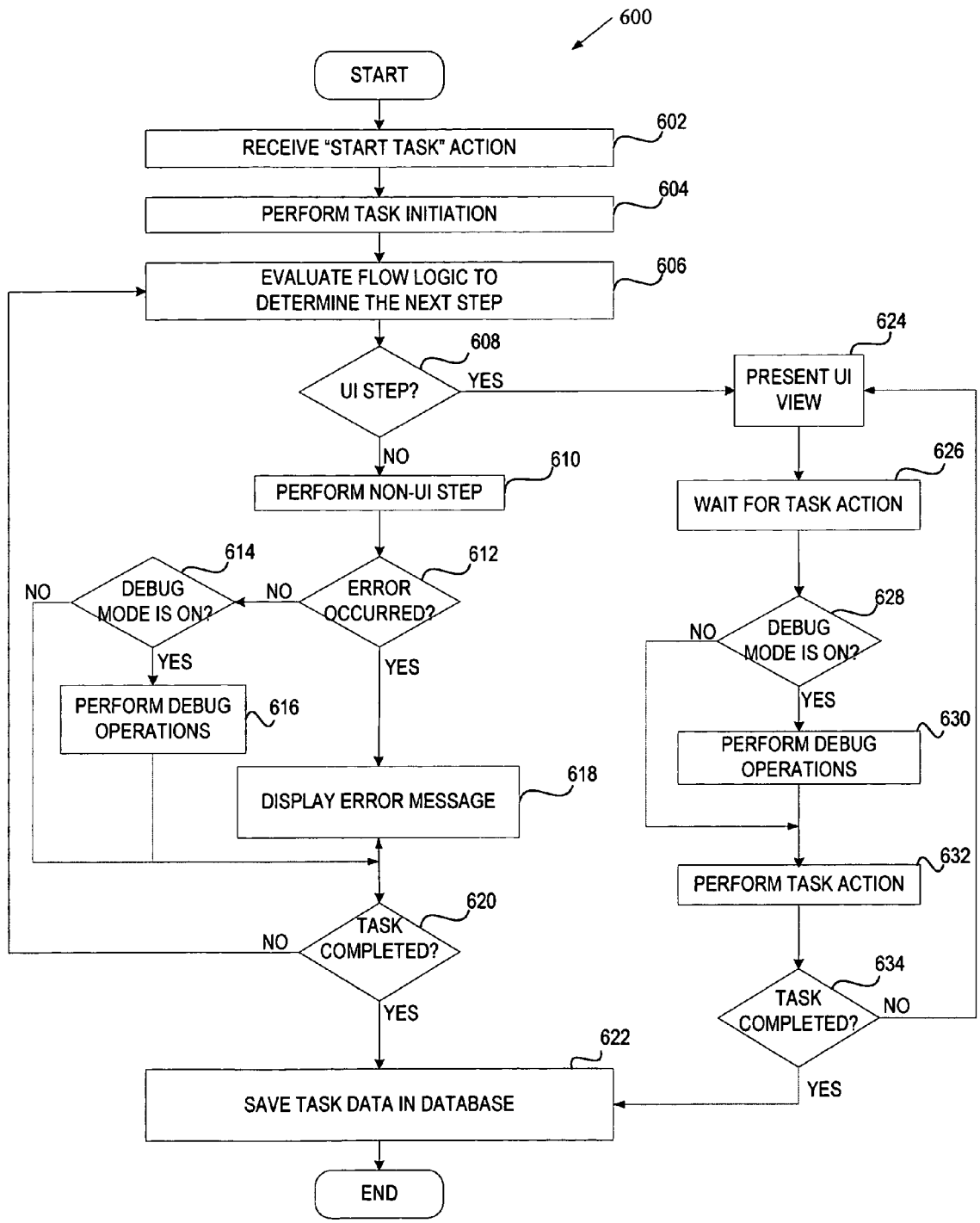
FIG. 6 is a flow diagram of one embodiment of a method for executing a task UI application having embedded debugging functionality.

FIG. 6 is a flow diagram of one embodiment of a method 600 for executing a task UI application having embedded debugging functionality. The method may be performed by processing logic that may comprise hardware (e.g., circuitry, dedicated logic, etc.), software (such as run on a general purpose computer system or a dedicated machine), or a combination of both. Processing logic may reside in the runtime engine 300 of FIG. 3.

Referring to FIG. 6, method 600 begins with processing logic receiving the Start Task action (block 602). The Start Task action may be received when an end user selects a new or paused task (e.g., stored in the Inbox). Alternatively, the Start Task action may be run when an end-user starts a new instance of a standalone task.

At block 604, processing logic initiates the task selected by the end user and determines the next UI view. In one embodiment, as part of task initiation, processing logic loads the definition of the task into a task definition cache maintained by the runtime engine 300. The definition of the task contains the collection of metadata discussed above. Then, processing logic may create a task instance and start the task transaction, followed by processing logic adding the Start step instance to the navigation stack, setting the current step to the Start step, and setting the navigation action to Next.

At block 606, processing logic evaluates, based on the task definition, the flow logic of the task to identify the next step to be performed. This may involve evaluation of all branching conditions if the current step is a decision step.

At block 608, processing logic decides whether the next step as determined in block 606 is the UI view. If not, processing logic performs the non-UI step (block 610) and checks for errors (block 612). If an error occurred, processing logic presents an error message (block 618) and proceeds to block 620. If no error occurred, processing logic checks whether the debug mode is on (block 614). If not, processing logic proceeds directly to block 620. If debug mode is on, processing logic performs debugging operations (block 616). As discussed above, the debugging operations may include collecting current state information, displaying the current state information in a debug window, and waiting for the user to dismiss the debug window (e.g., by activating the continue button in the debug window).

At block 620, processing logic determines if the current step is the last step of the task. If not, processing logic returns to block 606. If so, processing logic saves the task data in the database (block 622).

If processing logic decides at block 608 that the next step is the UI step, processing logic presents the UI view to the end user (block 624) and waits for a navigation action (e.g., Next, Previous, Pause or Cancel) in block 626. Upon receiving a navigation action (e.g., when an end user presses a navigation button), processing logic checks whether the debug mode is on (block 628). If not, processing logic proceeds directly to block 632. If so, processing logic performs debugging operations (block 630) before proceeding to block 632.

In block 632, processing logic performs the corresponding task navigation operations, which may include determining the next UI view and performing further debug operations, as will be explained in more detail below in conjunction with FIG. 7. Processing logic then proceeds to block 634, where it checks whether the task has been completed. If the task has been completed, data in task transaction is saved into the database (block 622), otherwise, the next UI view is presented (block 624), and the loop continues until the task is completed.

The navigation operations may allow the end-user to move to prior UI views (e.g., by activating the Previous button) and then retrace the steps (e.g., by activating the Next button). In one embodiment, the end user can optionally modify data entered and change execution basis. In one embodiment, the steps performed in the execution flow can be conditionally re-executed (e.g., if allowed by the settings provided by the intermediate user) when reached multiple times via the previous/next actions. In one embodiment, the UI view state is maintained across the end-user's previous/next actions. The UI view may be reconstituted in the state where it was left.

In one embodiment, processing logic allows for partial record editing. In particular, a record can be in an incomplete/invalid state when the Previous action is used. Then, partially entered data will be displayed to the end user when the view is returned to via a subsequent Next action. In one embodiment, a user can go iteratively through a sequence of views, and processing logic will maintain the history of step instances through each loop.

In one embodiment, processing logic supports alternate paths when re-executing steps. That is, if an end user uses the Previous button to go backward, he or she may change previously entered data values. Then, when the end user uses the Next button to move forward, the data entry changes can cause a different sequence of task steps to be followed. If so, processing logic follows this different sequence of steps.

In one embodiment, processing logic ensures that partially edited records, which have not been validated only show up in the execution branch and UI view that originally created them. If the task is completed, processing logic ensures that records that have not been validated do not get committed to the database.

Figure 7:
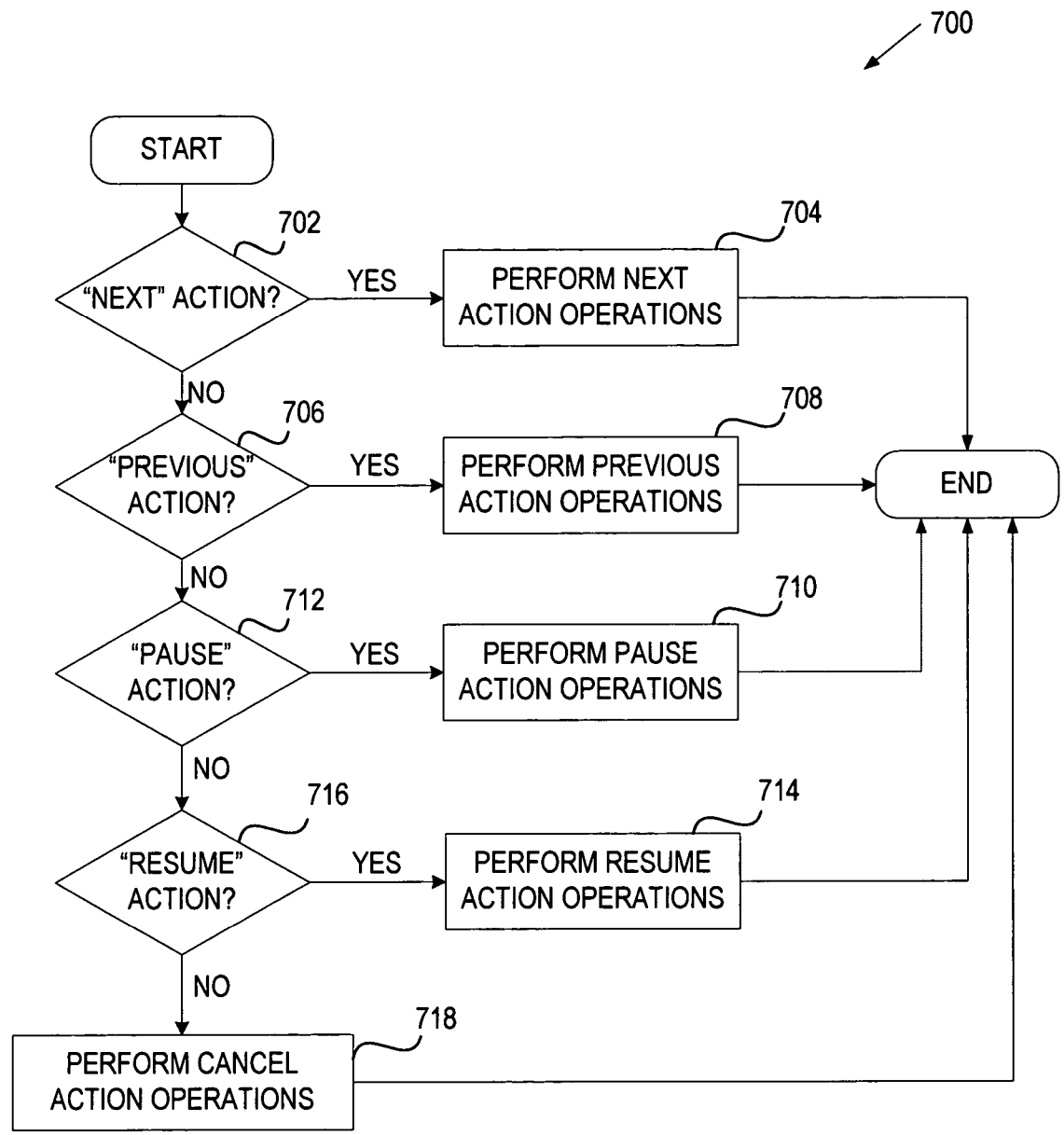
FIG. 7 is a flow diagram of one embodiment of a navigation method.

FIG. 7 is a flow diagram of one embodiment of a navigation method 700. The method may be performed by processing logic that may comprise hardware (e.g., circuitry, dedicated logic, etc.), software (such as run on a general purpose computer system or a dedicated machine), or a combination of both. Processing logic may reside in a task controller 304 of FIG. 3.

Referring to FIG. 7, method 700 begins with processing logic determining whether the current navigation action is the Next action (block 702). If so, processing logic performs the Next action operations (block 704). One embodiment of a process for performing the Next action operations will be discussed in more detail below in conjunction with FIG. 8.

If the current navigation action is the Previous action (block 706), processing logic performs the Previous action operations (block 708). One embodiment of a process for performing the Previous action operations will be discussed in more detail below in conjunction with FIG. 9.

If the current navigation action is the Pause action (block 712), processing logic performs the Pause action operations (block 714). If the current navigation action is the Resume action (block 716), processing logic performs the Resume action operations (block 720). If the current navigation action is none of the above, then processing logic decides that it is the Cancel action and performs the Cancel action operations (block 718). In one embodiment, Pause, Resume and Cancel operations do not require any debugging operations, as their behavior is not configurable.

The navigation operations utilize a history stack referred to as the Navigation stack. In particular, when a task step is first completed, the step instance information is stored in a frame of the Navigation stack. If the current task step is a view step, a snapshot of the current UI state is recorded in a frame of the Navigation stack. The task controller uses the Navigation stack to navigate between previously completed steps, and to restore UI states for the task views during backward navigation.

Figure 8:
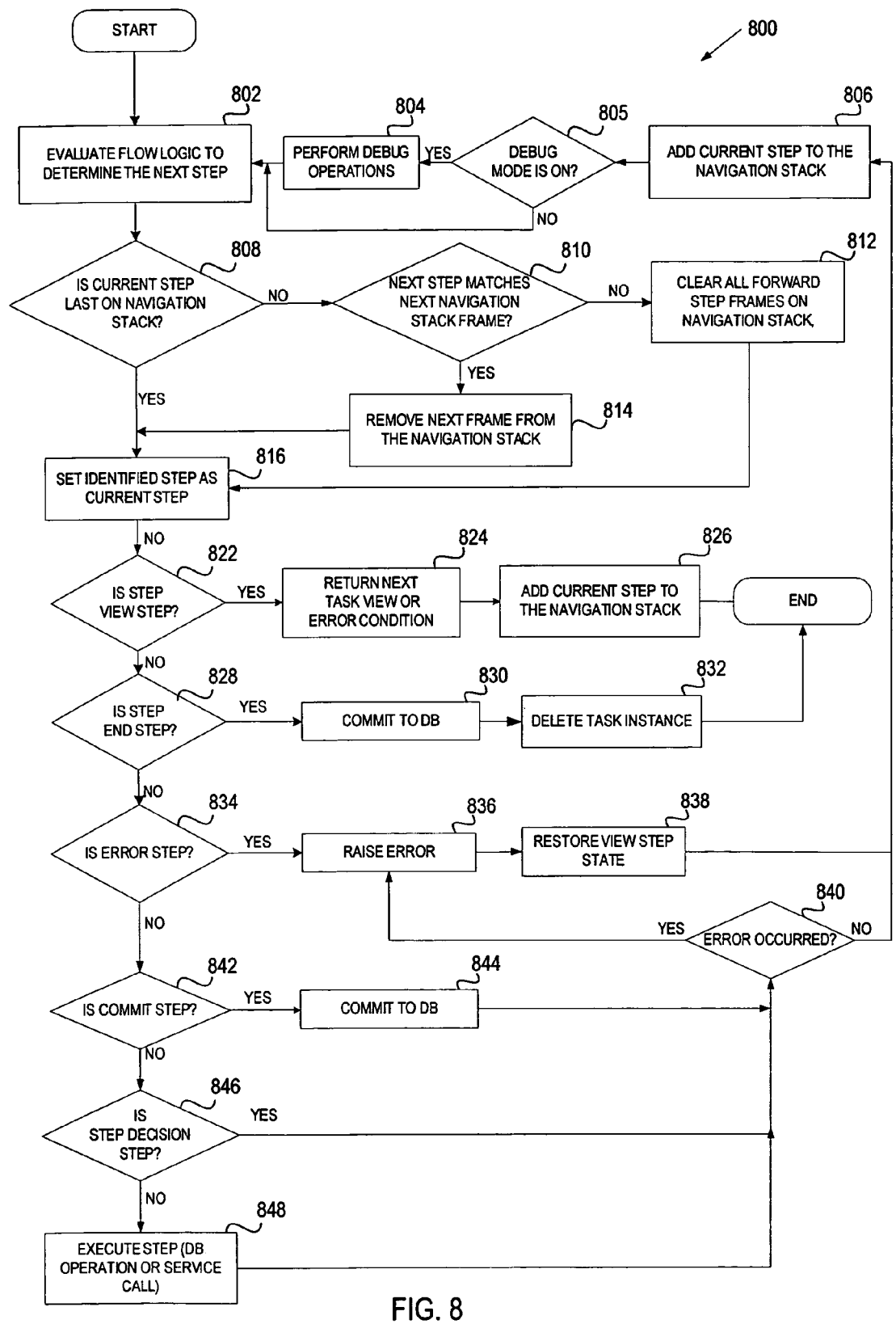
FIG. 8 is a flow diagram of one embodiment of a method for performing Next action operations.

FIG. 8 is a flow diagram of one embodiment of a method 800 for performing Next action operations. The method may be performed by processing logic that may comprise hardware (e.g., circuitry, dedicated logic, etc.), software (such as run on a general purpose computer system or a dedicated machine), or a combination of both. Processing logic may reside in a task controller 304 of FIG. 3.

Referring to FIG. 8, method 800 begins when a signal for a next action is received. Processing logic starts with evaluating the flow logic to determine the next step (block 802). This may include evaluation of all branching conditions if the current step is a decision step.

Once the next step has been identified, processing logic checks the navigation stack to see if the current step is the last step on the navigation stack (block 808). If false, the processing logic checks if the identified step is the same as the next step on the navigation stack (block 810). If this is also false, it means that the task execution sequence has been altered. As a result, the forward step history on the navigation step becomes invalid, and needs to be erased (block 812). Processing logic continues by setting the identified step as the current step (block 816). If the identified step is a task view step (block 822), processing logic returns it as the next task view (block 824), and adds the identified step to the navigation stack (block 826).

If the identified step is an end step (block 828), processing logic commits task data from temporary storage to the database (block 830) and deletes the current task instance (block 832).

If the identified step is an error step (block 834), processing logic raises the user-defined error (block 836), and restores the state to the last shown view (block 838).

If the identified step is a commit step (block 842), processing logic commits task data from temporary storage to the database (block 844). If successful, the commit step is added to the navigation stack (block 806).

If the identified step is a decision step (block 846), processing logic proceeds to add the decision step to the navigation stack (block 806).

If the type of the identified step is none of the above, it is either a database operation step or a service invocation step. In either case, processing logic executes the identified step (block 848) and, if successful, the executed step is added to the navigation stack (block 806).

After block 806, processing logic determines whether the debug mode is on (block 805). If not, processing logic proceeds to close the loop at block 802. If so, processing logic performs debugging operations (block 804) and then proceeds to block 802, at which point the above sequence is repeated until either a view or an end step is reached.

Figure 9:
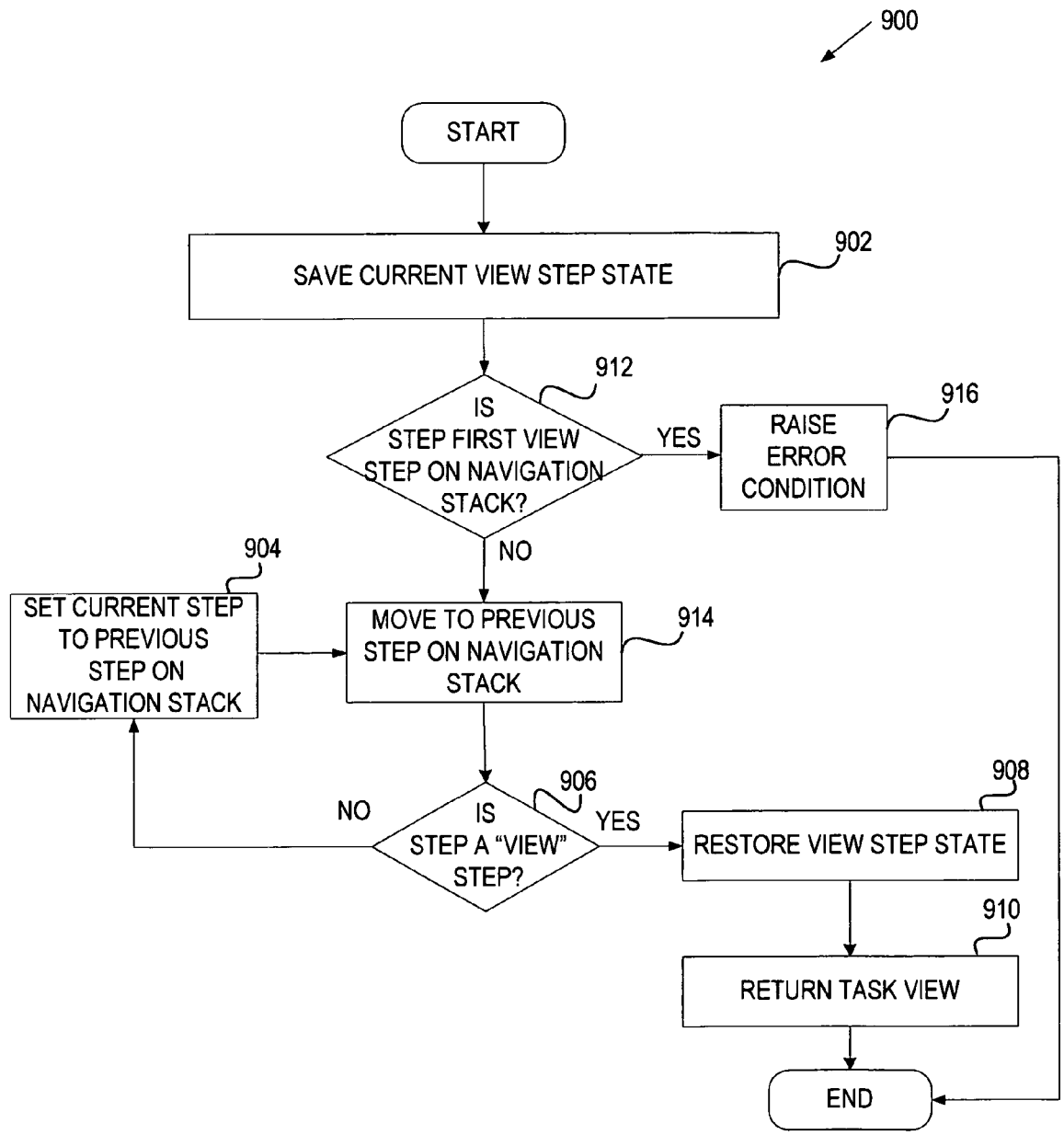
FIG. 9 is a flow diagram of one embodiment of a method for performing Previous action operations.

FIG. 9 is a flow diagram of one embodiment of a method 900 for performing Previous action operations. The method may be performed by processing logic that may comprise hardware (e.g., circuitry, dedicated logic, etc.), software (such as run on a general purpose computer system or a dedicated machine), or a combination of both. Processing logic may reside in a task controller 304 of FIG. 3.

Referring to FIG. 9, method 900 begins with processing logic saving the state of the current view step on the Navigation stack (block 902).

Next, processing logic sets the current step to the previous step from the Navigation step (block 904) and determines whether this task step is a view step (block 906). If so, processing logic restores the state of this view step (block 908) and returns this task view (block 910). If no, processing logic determines whether this view step is the first step on the navigation stack (block (912).

If this view step is the first view step on the navigation stack, processing logic returns an error (block 916). Otherwise, processing logic moves to the previous view step on the Navigation stack (block 914), restores its state (block 908), and returns its name as the name of the view to be presented to the end user (block 910).

Figure 10:
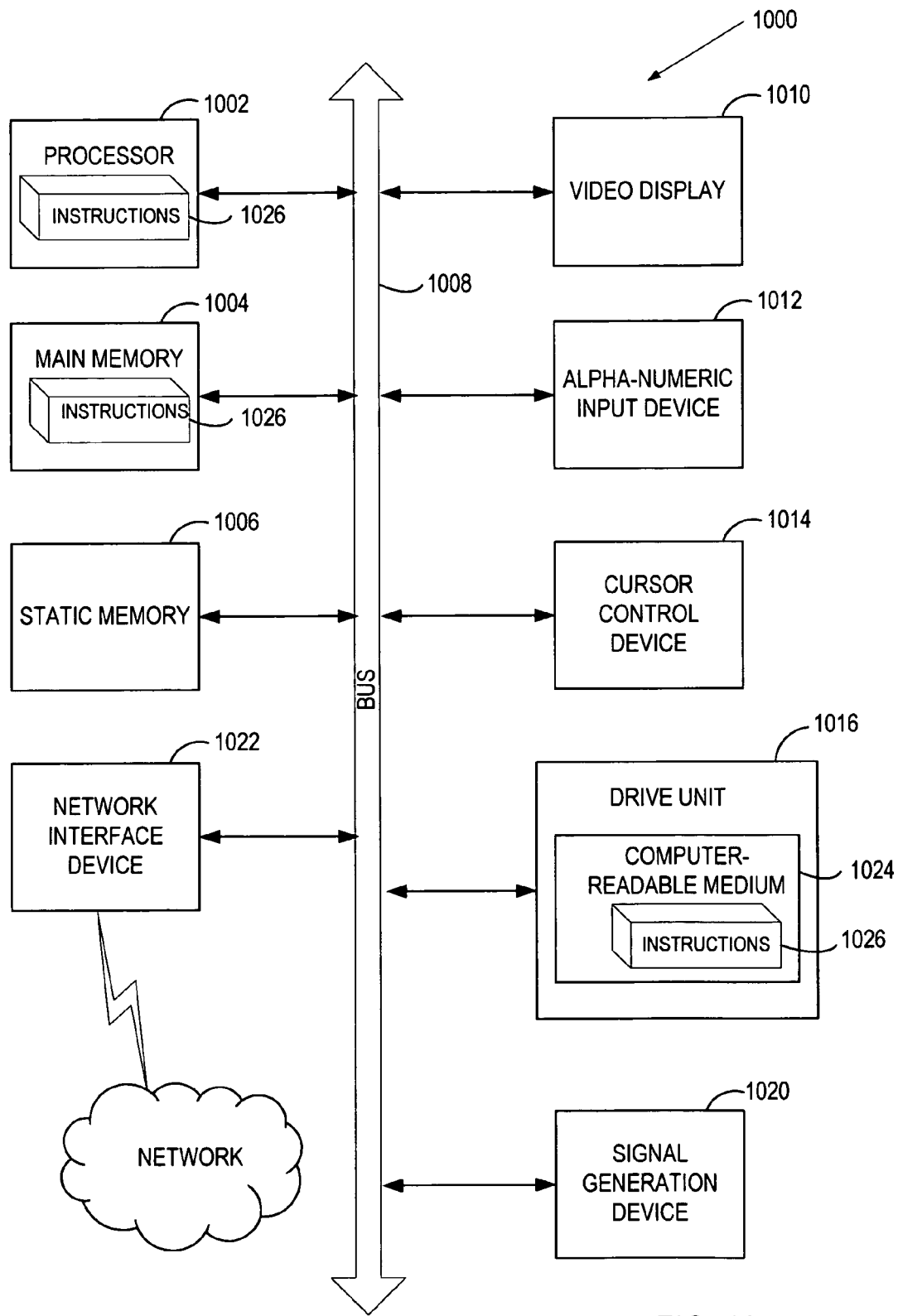
FIG. 10 is a block diagram of an exemplary computer system that may be used to perform one or more of the operations described herein.

FIG. 10 is a block diagram of an exemplary computer system 1000 (e.g., a computer system hosting task controller 304 and/or UI manager 302 of FIG. 3 and/or runtime engine 108 of FIG. 1) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1000 includes a processor 1002, a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alpha-numeric input device 1012 (e.g., a keyboard), a cursor control device 1014 (e.g., a mouse), a disk drive unit 1016, a signal generation device 1020 (e.g., a speaker) and a network interface device 1022.

The disk drive unit 1016 includes a computer-readable medium 1024 on which is stored a set of instructions (i.e., software) 1026 embodying any one, or all, of the methodologies described above. The software 1026 is also shown to reside, completely or at least partially, within the main memory 1004 and/or within the processor 1002. The software 1026 may further be transmitted or received via the network interface device 1022. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer-implemented method comprising:
   determining that a debugging functionality embedded in an application is requested,
   wherein
   the application supports an n-tiered architecture;
   collecting state information of the application at one or more operational break points as the application executes; and
   providing the state information to a user at each break point.

2. The method of claim 1, wherein the providing the state information to the user at each break point comprises:
   displaying the state information at each break point in a user interface of the application.

3. The method of claim 2, wherein the user interface is any one of a popup window, or a pane, wherein the user interface is provided by the application in both debug and non-debug mode.

4. The method of claim 2, further comprising:
   allowing the user to dismiss the user interface displaying the state information.

5. The method of claim 1, wherein:
   the application is flow driven; and
   break points are defined after each of a plurality of steps in a flow associated with the application.

6. The method of claim 5, wherein the plurality of steps are selected from the group consisting of a user interface (UI) view step, a database operation step, a business service invocation step, a decision point step, a commit step, an error step, a start step, an end step, and a subtask step.

7. The method of claim 5, wherein the state information comprises at least one of a last step executed within the flow, current values of local variables, a current state of business objects, or a current state of one or more active database records.

8. The method of claim 1, wherein the debugging functionality is requested during an execution of the application or prior to the execution of the application.

9. The method of claim 2, wherein determining that the debugging functionality is requested comprises:
providing an option for a debug mode in the user interface presented to the user by the application; and
receiving a user selection of the option for the debug mode.

10. The method of claim 1 further comprising:
determining that the user has requested to turn the debugging functionality off while the application is being executed; and
continuing execution of the application in a non-debug mode.

11. The method of claim 1, further comprising:
allowing the user to debug the application in a development environment.

12. The method of claim 1, wherein:
the application provides a set of user interfaces (UIs); and
a behavior of the set of UIs is the same in both debug and non-debug mode.

13. The method of claim 12, wherein:
the application provides navigation controls for the set of UIs, the navigation controls comprising at least one of a previous operation, a next operation, a pause operation, a resume operation, or a cancel operation; and
a behavior of the navigation controls is the same in both debug and non-debug mode.

14. A non-transitory machine-readable medium having stored thereon a set of executable instructions to cause a machine to perform a method comprising:
determining that a debugging functionality embedded in an application is requested,
wherein
the application supports an n-tiered architecture;
collecting state information of the application at operational break points as the application executes; and
providing the state information to a user at each break point.

15. A system comprising:
a server comprising
a processor, and
a memory coupled to the processor, the memory storing instructions executable by the processor, the instructions configured to:
determine that a debugging functionality embedded in an application is requested, wherein
the application supports a client-server architecture,
collect state information of the application at operational break points as the application executes, and
provide the state information to a client at each break point; and
a client computer, coupled to the server using a network, the client computer comprising a second processor, and
a second memory coupled to the second processor, the second memory storing second instructions executable by the second processor, the second instructions configured to:
host the application, and
display the state information to a user via a user interface of the application.

16. The system of claim 15, wherein the state information is displayed in a popup window or a pane displayed as part of the user interface (UI) provided by the application, the UI being provided by the application in both debug and non-debug mode.

17. The system of claim 15, wherein:
the application is flow driven; and
break points are defined after each of a plurality of steps in a flow associated with the application, the plurality of steps being selected from a group consisting of a user interface (UI) view step, a database operation step, a business service invocation step, a decision point step, a commit step, an error step, a start step, an end step, and a subtask step.

18. The system of claim 17, wherein the state information comprises at least one of a last step executed within the flow, current values of local variables, a current state of business objects, or a current state of one or more active database records.

19. The system of claim 15, wherein the instructions are further configured to determine that the debugging functionality is requested when the user selects an option for a debug mode in a user interface presented by the application.

20. The system of claim 15, wherein the instructions are further configured to determine that the user has requested to turn the debugging functionality off while the application is being executed, and to continue execution of the application in a non-debug mode.

* * * * *

UNITED STATES PATENT AND TRADEMARK OFFICE
CERTIFICATE OF CORRECTION

Page 1 of 1

PATENT NO. : 9,146,832 B2
APPLICATION NO. : 11/580946
DATED : September 29, 2015
INVENTOR(S) : Degenhardt et al.

It is certified that error appears in the above-identified patent and that said Letters Patent is hereby corrected as shown below:

On the title page, item [60], delete "61/727,248" and insert -- 60/727,248 --, therefor.

On title page 2, item [56], column 2, line 7, delete "Interent" and insert -- Internet --, therefor.

In the specification

Column 4, line 35, delete "resulting collection" and insert -- resulting properties of collection --, therefor.

Column 6, line 65, delete "embodiment, the" and insert -- embodiment, the one end user --, therefor.

Signed and Sealed this
Thirty-first Day of May, 2016

Michelle K. Lee
*Director of the United States Patent and Trademark Office*